(12) United States Patent
Barthold et al.

(10) Patent No.: US 10,193,446 B2
(45) Date of Patent: Jan. 29, 2019

(54) MULTI-MODULE DC-TO-DC POWER TRANSFORMATION SYSTEM

(71) Applicants: Lionel O. Barthold, Queensbury, NY (US); Electranix Corporation, Winnipeg, MB (CA)

(72) Inventors: Lionel Barthold, Queensbury, NY (US); Dennis Woodford, Winnipeg (CA); Maryam Salimi, Winnipeg (CA)

(73) Assignees: Lionel O. Barthold, Queensbury, NY (US); ElecTranix Corporation, Winnipeg, MB (CA)

( * ) Notice: Subject to any disclaimer, the term of this patent is extended or adjusted under 35 U.S.C. 154(b) by 0 days.

(21) Appl. No.: 15/288,119

(22) Filed: Oct. 7, 2016

(65) Prior Publication Data

US 2017/0025954 A1   Jan. 26, 2017

Related U.S. Application Data (63) Continuation of application No. PCT/US2015/010274, filed on Jan. 6, 2015.
(Continued)

(51) Int. Cl.
  *H02M 3/158* (2006.01)
  *H02M 3/155* (2006.01)
  (Continued)

(52) U.S. Cl.
  CPC ........... *H02M 3/158* (2013.01); *H02M 3/155* (2013.01); *H02M 3/1584* (2013.01);
  (Continued)

(58) Field of Classification Search
  None
  See application file for complete search history.

(56) References Cited

U.S. PATENT DOCUMENTS 8,284,576 B2    10/2012   Danesh-Pajooh-Nejad et al.
8,373,307 B2    2/2013    Sihler et al.
(Continued)

FOREIGN PATENT DOCUMENTS

CN    102340241 A    2/2012
CN    103296882 A    9/2013
(Continued)

OTHER PUBLICATIONS

The International Search Report and the Written Opinion of the International Searching Authority dated May 1, 2015 or PCT Application No. PCT/US2015/010274.
(Continued)

*Primary Examiner* — Jeffrey A Gblende
(74) *Attorney, Agent, or Firm* — Brian M. Dingman; Dingman IP Law, PC (57) ABSTRACT

A transformation system capable of efficiently transforming electrical power from one dc voltage to a second dc voltage or of regulating power flow within a network of constant nominal voltage; in each case without intermediate magnetic transformation. The transformation system is based on periodic and resonant delivery of charge from the first of two dc nodes to a system of capacitors, electrical reconfiguration of those capacitors, then delivery of power to a second dc node.

21 Claims, 8 Drawing Sheets

Related U.S. Application Data (60) Provisional application No. 61/977,555, filed on Apr. 9, 2014.

(51) Int. Cl.
*H02M 1/00* (2006.01)
*H02M 7/483* (2007.01)

(52) U.S. Cl.
CPC ............ *H02M 2001/0058* (2013.01); *H02M 2007/4835* (2013.01); *Y02B 70/1425* (2013.01); *Y02B 70/1491* (2013.01)

(56) References Cited

U.S. PATENT DOCUMENTS

| | | | | |
|---|---|---|---|---|
| 2011/0254528 | A1* | 10/2011 | Danesh-Pajooh-Nejad | H02M 3/33584 323/311 |
| 2011/0292687 | A1* | 12/2011 | Barthold | H02M 3/07 363/15 |
| 2012/0038224 | A1* | 2/2012 | Hohmann | H03K 3/57 307/109 |
| 2013/0044527 | A1* | 2/2013 | Vracar | H02M 7/487 363/131 |
| 2013/0119970 | A1* | 5/2013 | Trainer | H02M 3/07 323/364 |
| 2015/0091488 | A1* | 4/2015 | Zhang | H02P 27/06 318/519 |

FOREIGN PATENT DOCUMENTS

| | | |
|---|---|---|
| WO | 2011/060812 A1 | 5/2011 |
| WO | 2012/167826 A1 | 12/2012 |
| WO | 2013/004282 A1 | 1/2013 |
| WO | 2013017160 A1 | 2/2013 |

OTHER PUBLICATIONS

The International Preliminary Report on Patentability dated Oct. 12, 2016 for PCT Application No. PCT/US2015/010274.

The European Search Report dated Nov. 7, 2017 for EP Patent Application No. 15776254.3.

* cited by examiner

MULTI-MODULE DC-TO-DC POWER TRANSFORMATION SYSTEM

CROSS-REFERENCE TO RELATED APPLICATIONS

This application is a continuation of International Application PCT/US15/10274 filed on Jan. 6, 2015, which claims priority to Provisional Application 61/977,555, filed on Apr. 9, 2014. The disclosures of both such applications are incorporated herein by reference.

FIELD

This innovation pertains to conversion of electric power from one dc voltage to another dc voltage without the use of magnetically-based transformers.

BACKGROUND

Technologies used in conversion between alternating current (ac) and direct current (dc) have advanced rapidly over the past decades, as has the use of dc as a means of transporting large amounts of power. Dc transports power more efficiently than ac and unlike ac, is able to do so at a controlled level, e.g. at a level corresponding to the maximum thermal capability of the conductors used.

The number of high voltage dc transmission projects has grown in distance, voltage level and power rating. Furthermore the need for dc-to-dc transformation has been limited since, irrespective of the dc transmission voltage, ac transformers are included in both sending and receiving terminals so that conversion to a voltage convenient to the local system is quite straight forward. However ongoing evolution of the world's electric supply system gives rise to at least four general applications where direct dc-to-dc transformation can have an important role.

1. Both in Europe and North America, system planners foresee the need for an extensive, very high voltage dc network to serve as an overlay to the existing ac transmission system. However in addition to the connection of such a grid to key points in that ac system, an economic dc-to-dc transformer will allow both interconnection of that grid to a number of major existing dc transmission lines and transformation of different dc voltages among dc lines comprising a dc grid, thereby providing major additional economic benefits to consumers of electricity.
2. In context of a dc grid the ac-to-dc converters that connect ac systems to the dc grid will have limited control of power through the various dc transmission lines comprising the grid. Dc-to-dc transformers placed strategically in the dc grid will provide a desired dc power flow through the transmission lines of the dc grid where it is not possible to accomplish with the ac-to-dc converters
3. The electrical architecture of wind farms is relatively complex and, in some systems, makes use of ac-to-dc conversion at the wind turbine site to accommodate the asynchronous nature of the ac voltage generated by variable speed blades. Rather than reconvert that dc to synchronous ac, as is now the practice, direct transformation of that dc energy to a higher dc level for aggregation within a wind farm, and to a yet higher dc voltage for transmission to a load center, could affect major cost reductions in the aggregation of power at a central point on the wind farm as well as transmission of the collected power to a convenient point on the ac receiving system.
4. Household, commercial, and industrial loads are increasingly either dependent on dc or, in some cases, could operate more efficiently if converted to dc. Charging load for electric automobiles, projected to grow very rapidly as a percentage of total electrical load, is a prime example. This realization has steadily increased the interest in dc distribution systems whereby dc loads, rather than depending on either small scale plug-in or internal ac-to-dc converters, could be served directly from existing distributions poles or cable routes.

DESCRIPTION OF PRIOR ART

There is a wealth of technology, patent filings, and experience with dc-to-dc conversion at very low voltage (electronic) levels, e.g. within power supplies for computers, telephones, and other electronic devices. However this technology has been developed with vastly different needs and different constraints than those characterizing higher voltage power-level applications as addressed in the present disclosure. For example insulation requirements at the millivolt level are a secondary issue, while at high dc voltage it is paramount. Available switching devices differ as well, as do constraints on practical capacitor-to-capacitor and capacitor-to-node switching methods. At electronic levels heat generation is a greater limit to losses than efficiency whereas the reverse is true in high voltage power applications. Furthermore, since inclusion of reactors within circuit boards is impractical, transfer of charge from one capacitor to another or between two capacitors must be done directly, thus resulting in high losses. Thus opportunities for direct adaptation of electronic technology to high voltage dc applications are limited.

Where conversion of between two higher dc voltages is needed, as is the case in sonic industrial applications, dc is first converted to a convenient ac level, often at a high ac frequency to reduce the cost of a transformer used to change to another ac voltage and thence, through an ac-to-dc then transformed by a conventional inductive transformer to a different ac voltage, and finally transformed from ac to the desired dc secondary voltage. While effective technically, triple transformation schemes of this type are expensive and relatively inefficient.

SUMMARY

The foregoing illustrates the need for an efficient and economical dc-to-dc transformer (DCT) (i.e., a transformation system at high power levels) capable of both upward and downward transformation of voltage and, where necessary, operating at the highest existing dc voltage levels at ratings in the thousands of megawatts. To match the functionality of ac transformers through which power transfer is proportional to phase angle difference between primary and secondary systems, a DCT should operate, without a power controller, to the difference in voltage between primary and secondary systems. The systems and methods for capacitive energy transformation described herein are capable of fulfilling that requirement with efficiencies comparable to existing ac-to-ac magnetic transformation.

Resonant switching, i.e. the connection between capacitors and a high voltage node through a reactor such that energy interchange is oscillatory and can be interrupted at the first current zero, is used in this disclosure. It will find application in various situations analogous to the function served by magnetically-based transformers in ac systems, e.g. regulating power flow between two or more dc systems or among multiple power lines comprising a high voltage dc grid as well as transforming modest levels of power from a very high dc voltage at which dc-to-ac conversion is uneconomic to a lower dc voltage level where conversion to ac is less costly. It will also find application in transformation of variable frequency sources such as wind generators to a higher dc voltage, resulting in more economic connection of individual wind generators to a common point and connection of their aggregation to a convenient point on the receiving ac grid, as well as conversion of ac to dc for distribution, as dc, to homes, business and industry. Other applications of the subject system will be apparent to those skilled in the art and are within the scope of this disclosure.

This disclosure features a multi-module dc-to-dc power transformation system that is constructed and arranged to transform power from a first high dc voltage node to a separate second high dc voltage node. The system includes (a) a column comprising a plurality of half-bridge modules connected in series, each half-bridge module comprising a series connected capacitance capable of being either electrically inserted into the column or electrically isolated and electrically bypassed, wherein a first end of the column is electrically connected to ground, (b) two high voltage switches, each in series with a reactor; one high-voltage switch adapted to electrically connect a second end of the column to the first high voltage node and the other high-voltage switch adapted to electrically connect the second end of the column to the second high voltage node, and (c) a controller adapted to control the states of the switches within the column and the two high voltage switches so as to transform power by resonant exchange of energy between multiple capacitances within the column and the two nodes.

A half-cycle of resonant and sinusoidally varying current, initiated by the connection of multiple capacitances of the column to high voltage nodes and interrupted at its first current-zero point, may be used by the controller as a means to achieve exchange of energy between those multiple capacitances and the high voltage nodes. A ratio of input and output voltage can be established by causing the controller to affect switch positions which electrically bypass selected capacitances of the column between acceptance of charge from the first high voltage dc node and delivery of charge to the second high voltage dc node.

Stable operation may be achieved by equalizing the charge on a group of capacitances, such charge equalization accomplished by using the controller to selectively reassign by-pass states among multiple capacitances during the connection to a lower voltage node. Stable operation may be achieved by using the controller to bypass different capacitances from one charge-discharge cycle to the next.

The system may have multiple columns connected in parallel between ground and the two high voltage nodes, with separate high-voltage switches in series with a reactor between the second end of each column and each of the two nodes, and wherein the controller is adapted to control the states of all of the switches. The controller may be further adapted to establish input and output current pulses to or from multiple columns that are additive. The controller may be further adapted to cause the generation of pulses from each of the columns and that are equally spaced in time from each other.

A half-cycle of resonant and sinusoidally varying current, initiated by the connection of multiple capacitances of the column to high voltage nodes and interrupted at its first current-zero point, may be used by the controller as a means to achieve exchange of energy between those multiple capacitances and the high voltage nodes. A ratio of input and output voltage may be established by causing the controller to affect switch positions which electrically bypass selected capacitances of each column between acceptance of charge from the first high voltage dc node and delivery of charge to the second high voltage dc node.

Stable operation may be achieved by equalizing the charge on a group of capacitances in each column, such charge equalization accomplished by using the controller to selectively reassign by-pass state among multiple capacitances during the connection to a lower voltage node. Stable operation may be achieved by using the controller to bypass different capacitances in each column from one charge-discharge cycle to the next.

Also featured herein is a system for power transfer regulation from a first node at one high dc voltage to a second node at nominally the same high dc voltage. The system includes a plurality of capacitances and a controller that is adapted to use the capacitances so as to resonantly exchange energy between the capacitances and the two nodes.

A half-cycle of resonant and sinusoidally varying current, initiated by the connection of multiple capacitances of the column to high voltage nodes and interrupted at its first current-zero point, may be used by the controller as a means to achieve exchange of energy between those multiple capacitances and the high voltage nodes. A ratio of input and output voltage can be established by causing the controller to affect switch positions which electrically bypass selected capacitances between acceptance of charge from the first high voltage dc node and delivery of charge to the second high voltage dc node.

Stable operation may be achieved by equalizing the charge on a group of capacitances, such charge equalization accomplished by using the controller to selectively reassign by-pass state among multiple capacitances. Stable operation may be achieved by using the controller to bypass different capacitances from one charge-discharge cycle to the next.

The controller may be further adapted to establish input and output current pulses to or from multiple columns that are additive. The controller may be further adapted to cause the generation of pulses that are equally spaced in time from each other. A half-cycle of resonant and sinusoidally varying current, initiated by the connection of multiple capacitances of the column to high voltage nodes and interrupted at its first current-zero point, may be used by the controller as a means to achieve exchange of energy between those multiple capacitances and the high voltage nodes. A ratio of input and output voltage can be established by causing the controller to affect switch positions which electrically bypass selected capacitances between acceptance of charge from the first high voltage dc node and delivery of charge to the second high voltage dc node. Stable operation may be achieved by equalizing the charge on a group of capacitances, such charge equalization accomplished by using the controller to selectively reassign by-pass state among multiple capacitances during the connection to a voltage node. Stable operation may be achieved by using the controller to bypass different capacitances from one charge-discharge cycle to the next.

BRIEF DESCRIPTION OF THE DRAWINGS

Other objects, features and advantages will occur to those skilled in the art from the following description of the preferred embodiments of the innovations and the accompanying drawings.

EMBODIMENTS

To simplify explanation of the embodiments cited herein, commonly used power electronic switching devices such as thyristors, insulated gate bipolar transistors (IGBTs) and diodes, are all represented herein by a simple switch symbol, their function being clear from the context of the figures presented. Furthermore the more general identification of "nodes" will, in high voltage power applications correspond to "busses."

Embodiments cited herein are based solely on electrical charge transfers between high voltage dc busses and multiple capacitors. Transfers of that kind would result in high losses unless done resonantly, i.e. by placing an inductance in series with the switch effecting the transfer, thus causing a resonant sinusoidal wave of current which can be interrupted at current zero by power electronic switching devices, e.g. thyristors or solid state bidirectional switches, leaving the capacitor(s) involved with either an increase or decrease in charge and a corresponding higher or lower voltage. The principles of such resonant transfers are well known to those versed in the art.

Figure 1:
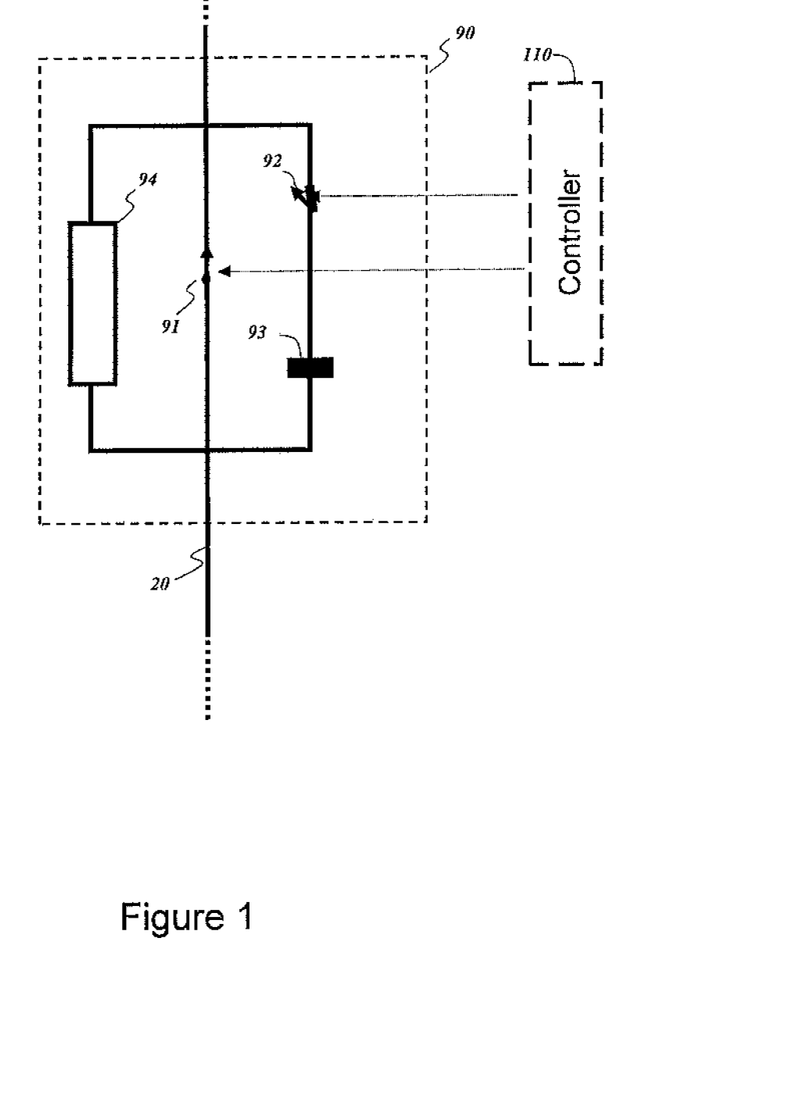
FIG. 1 shows a power level half-bridge module with internal switches configured to disconnect and bypass the internal capacitor.

Capacitor(s) 93 involved in one embodiment of the present system is embedded in a half-bridge module 90 as illustrated in FIG. 1. The term "half-bridge" as used in this disclosure refers either to (1) a composite capacitor and switch module as shown in FIG. 1 which is capable of either electrically inserting a capacitance into a series circuit or isolating that capacitance and bypassing it within the same series circuit and is commonly identified with the name "half-bridge," or (2) any other configuration of switches and capacitances which collectively function as the half-bridge described above. Note that the capacitance 93 is illustrated as a single capacitor but the capacitance could also be accomplished with a series of electrically coupled capacitors or other devices that exhibit capacitance.

Also shown in FIG. 1 is a controller 110 which regulates the sequence and timing of all switches in the various embodiments described herein; this controller is present in each example but is not shown in every drawing. The controller can be part of a custom circuit that includes the half bridges or it can be a separate controller that is operably coupled to the switches. FIG. 1 also shows a commonly applied protective device 94 to protect elements within the half-bridge in the event of an electrical fault in the system within which it is applied. Such modules 90 may consist either of independently arrayed switches 91, 92 and capacitor 93 or commercially available and commonly applied half-bridge modules 90 consisting of the same components 91, 92, 93. Commercially available modules are equipped with capacitors 93 of relatively high microfarad rating.

Figure 2:
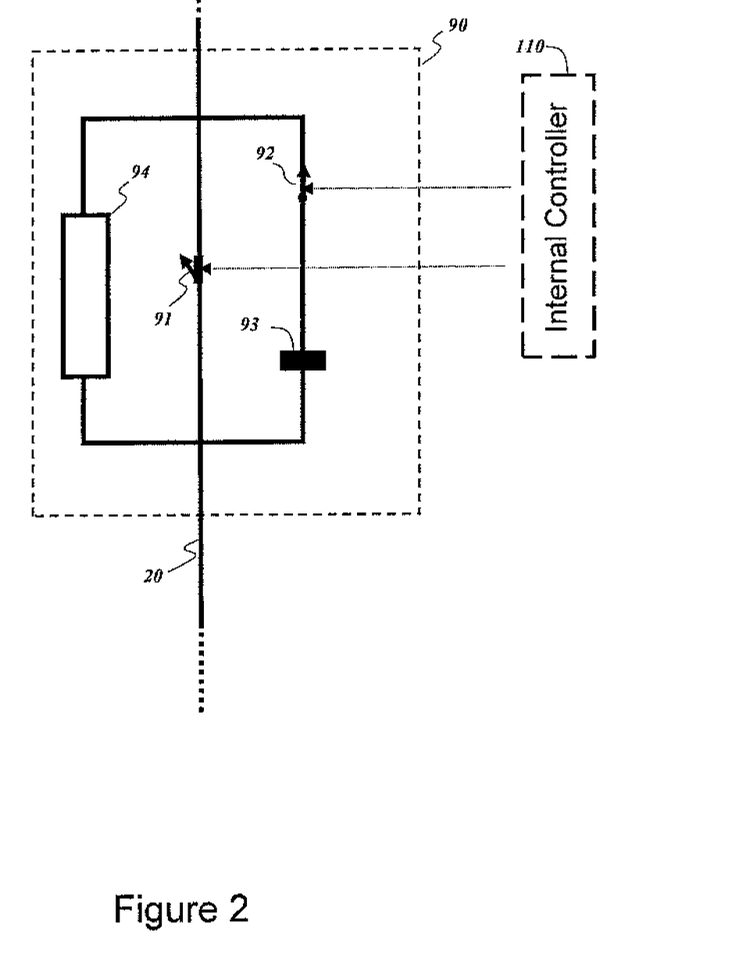
FIG. 2 shows a power level half-bridge module with internal switches configured to insert the internal capacitor into the circuit to which it is connected.

Capacitor 93 may be either inserted into circuit 20 by opening of switch 91 and closing switch 92, or removed from circuit 20 and bypassed by opening switch 92 and closing switch 91. Changing from one state to another within such a module 90 can be achieved in the order of microseconds; orders of magnitude shorter than a reasonable period of resonant charge exchange between capacitors 93. Whereas FIG. 1 shows the capacitor 93 within the half-bridge disconnected from the series circuit of which it is a part by the closing of switch 91 and opening of switch 92, FIG. 2 shows the same capacitor 93 inserted into the series circuit by opening of switch 91 and closing of switch 92.

Figure 3:
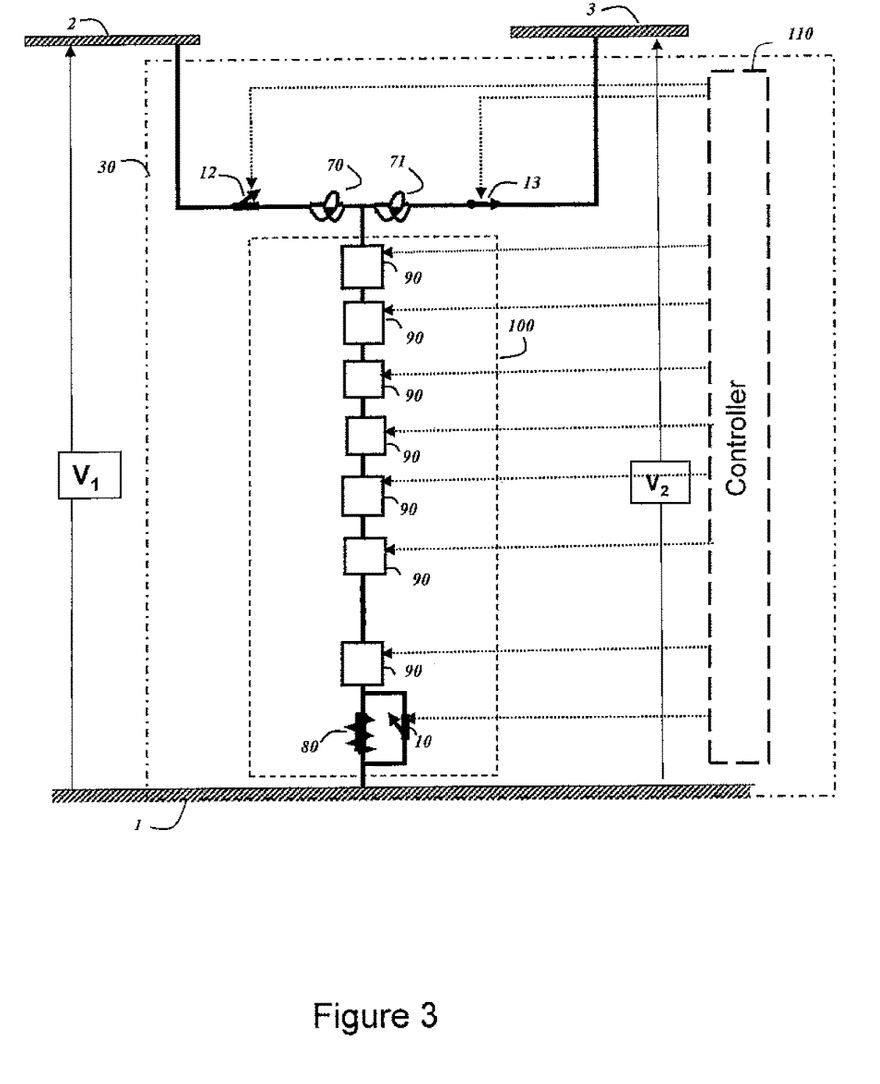
FIG. 3 shows a multi-modular dc-to-dc power transformation system embodiment configured for initial pre-operational charging of capacitors within half-bridge modules.

FIG. 3 illustrates a basic embodiment of a multi-module dc-to-dc power transformation system 30 disclosed herein which uses a column 100 comprised of multiple half-bridge modules 90 connected in series. Column 100 can be alternately connected either to a first high voltage dc node 2 through reactor 70 and switch 12 or a second high voltage dc node 3 through a second reactor 71 and second switch 13. In practice, these switches 12 and 13 and their counterparts in subsequent drawings are complementary, i.e. when one switch is closed the other will always be open, thus always providing galvanic isolation between the two high voltage dc nodes 2 and 3. Reactors 70 or 71 may be made to vary in value when the dc voltage transformer ratio is made adjustable.

The embodiment shown in FIG. 3 will operate either as a step-up or a step-down transformer of energy. In either case this embodiment operates with two repetitive steps which comprise an operating cycle. Consider first operation as a step-up DCT Start-Up Assume there are a total of n half-bridge modules 90 within the column of capacitive modules 100, each containing a capacitor 93 which can, as illustrated in FIG. 1, be electrically inserted into that column 100 or bypassed and electrically removed from that column 100. Assume further, that the $V_2 > V_1$ so that the DCT illustrated in FIG. 3 is intended to convert energy at a nominal voltage $V_1$ up to energy at a higher nominal voltage $V_2$. During initial start-up energization, switch 12 is open and switch 13 is caused to close as shown in FIG. 3, thus providing an initial charging path for the column of capacitive modules 100 from the second high voltage node 3 to ground 1. During this initial charging, switch 10 is opened, inserting resistor 80 into the initial charging path, thereby avoiding resonant overshoot and leaving each of the n capacitors 93 within the column of modules 100 with a charge of $V_2/n$. Switch 13 is then opened and switch 10 permanently closed for normal operation. Ground is defined as being either an actual ground, or to a metallic return conductor, or to the same end of another DCT connected to a pole of opposite polarity in a dc system with no immediate ground.

Figure 4:
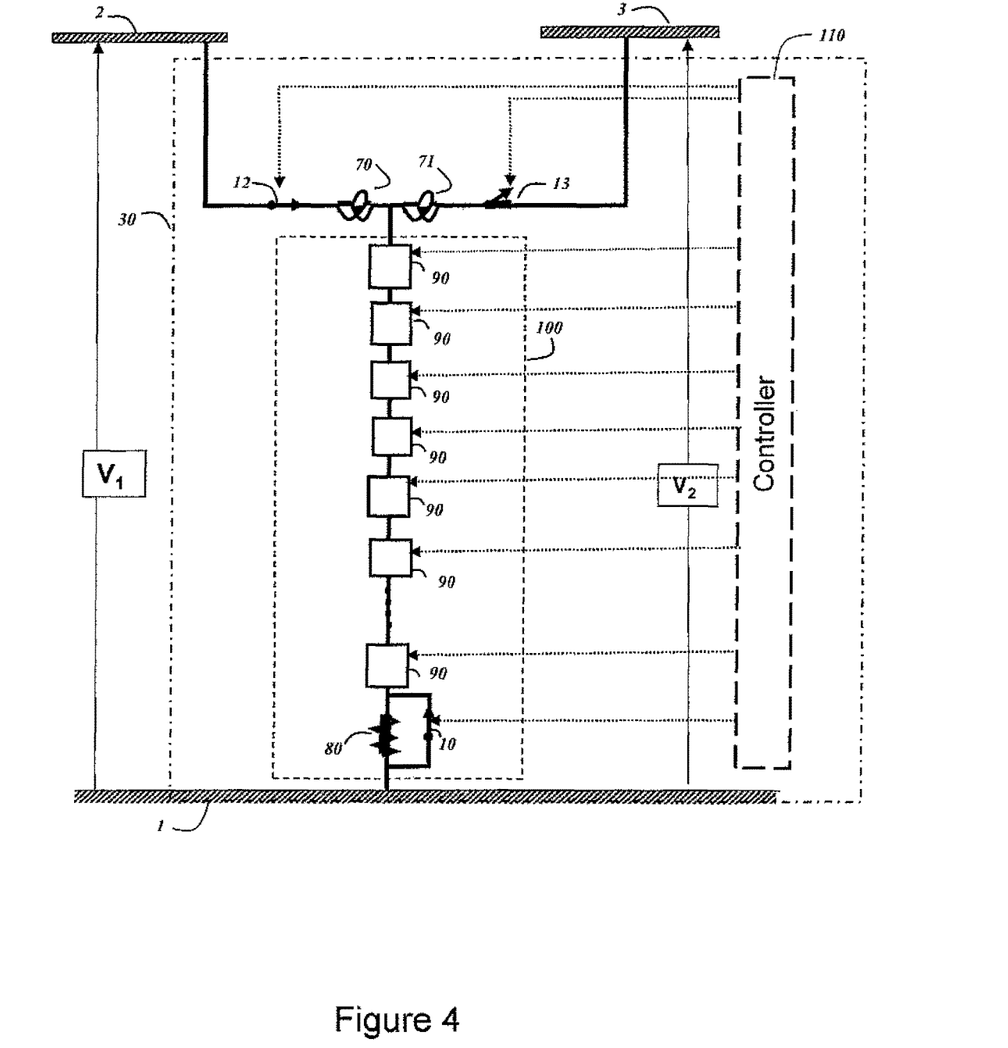
FIG. 4 shows a multi-modular dc-to-dc power transformation system embodiment configured to receive charge from one high voltage dc node.
Figure 5:
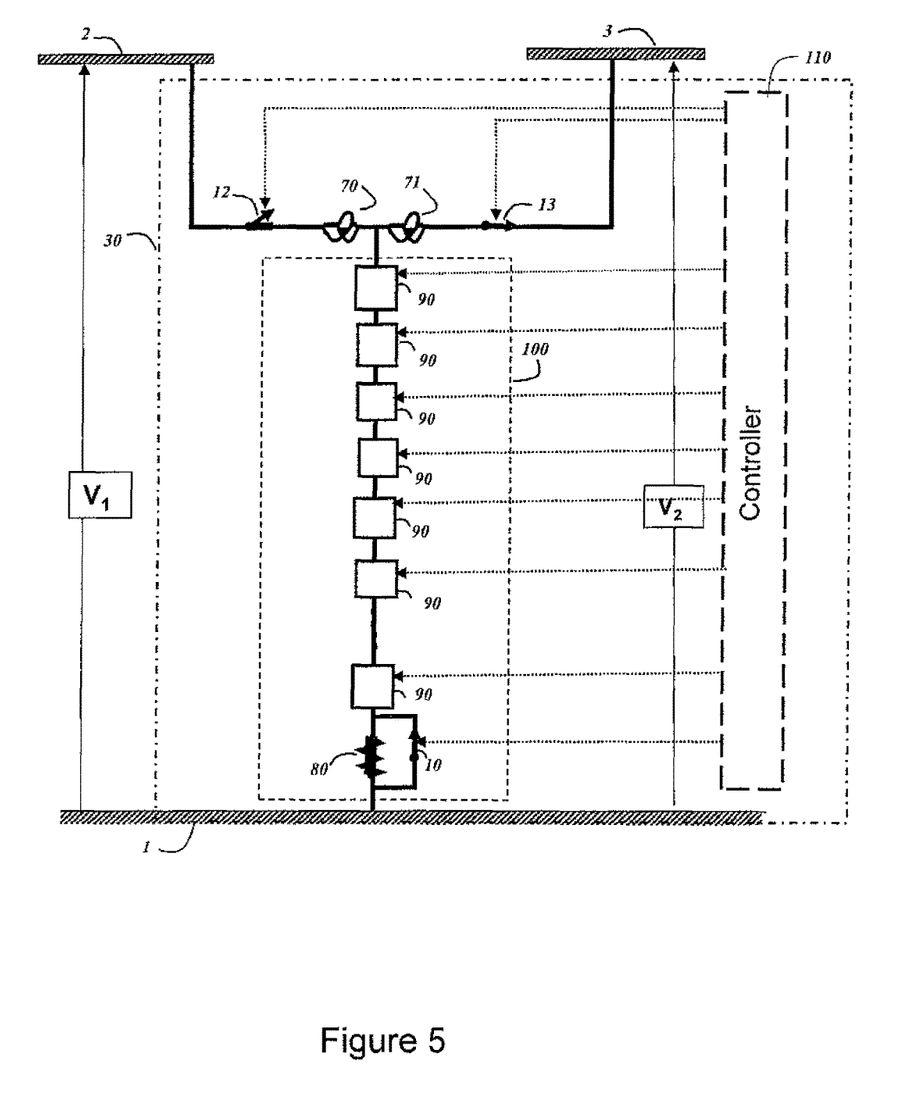
FIG. 5 shows a multi-modular dc-to-dc power transformation system configured to deliver charge to a second high voltage dc node.

Step 1
Switch 13 being now open, m (where m is less than n) capacitors 93 within the capacitive modules 90 comprising the column 100 are bypassed, thus leaving the capacitive column 100 with a reduced voltage of $(n-m)/n \times V_2$. Suppose, for example, that n and m are selected such that the ratio $(n-m)/n$ is exactly equal to $V_1/V_2$. In that case the voltage on either side of switch 12 will be the same and closing that switch 12 as illustrated in FIG. 4 will cause no charge transfer from the first high voltage bus 2 to the capacitive column 100. Suppose however that the voltage on the first high voltage node 2 is caused to be somewhat greater than $(n-m)/n \times V_2$. In that case closing of switch 12 in FIG. 4 will result in a resonant charge transfer from the first high voltage node 2 to n−m of the capacitors 93 within the capacitive column 100 while, as noted above, m of those capacitors 93, still bypassed remain charged to $V_2/n$. If both the m bypassed capacitors 93 and the n−m unbypassed capacitors, in series, were then simply connected resonantly to the second high voltage bus 3 as shown in FIG. 5, the voltage of the capacitive column 100 would exceed $V_2$ and result in energy being transferred to that bus. The result however would also leave n−m capacitors with higher post-discharge voltage than the m capacitors—a difference that would grow with each repeating cycle. Thus within this embodiment, during the resonant half cycle of charging time during which n−m capacitors 93 are receiving charge from the first high voltage node 2 as shown in FIG. 4, the actual number of the bypassed capacitors remains equal to m. However, the capacitor(s) that are bypassed should be rotated among capacitors 93, in one or multiple cycles in a sequence and for time durations that assures that all capacitors, m and n−m have equal charge and voltage variations. This is a commonly used charge equalization process called "sorting."

Step 2:
This step consists only of closing switch 13 to resonantly discharge the total capacitive column 100, now with all bypasses removed, to the second high voltage bus 3 as is shown in FIG. 5.

A modification of this embodiment, which will also overcome the cumulative unbalance in capacitor voltages cited above and remedied above by sorting procedures, can be achieved by continually rotating the assignment of bypassed capacitors between charge and discharge cycles. Thus a capacitor which is bypassed in one cycle may not be bypassed in the next several cycles, and a capacitor not bypassed in that cycle may be bypassed in the next, the selection in each case being made so as to stabilize charge distribution among all capacitors over a large number of cycles.

It will be apparent from the above that in this embodiment the amount of power flowing from the primary node 2 to the secondary node 3 will depend on the degree to which the primary voltage rises above $V_2 \times (n-m)/n$ and, further, that if that voltage on the primary bus 2 falls below $V_2 \times n-m)/n$, the sequence set forth above will result in power flow from second high voltage node 3 to the first high voltage node 2.

It is equally apparent that flow direction and level will respond in the same manner to changes in the voltage level of the secondary node 3. These changes in power flow are the consequence of external voltage adjustments rather than a power control signal. Thus flow through this dc transformation system embodiment will be governed by the ratio of terminal voltages in relationship to the ratio of n and m, just as, with an ac transformer, flow is dictated by the phase angle difference of the systems on its two terminals. If this embodiment is used to link to independent dc systems it will exchange power between those systems without internal power controls and in response to voltage adjustments on either system. Furthermore if the embodiment links two dc systems of identical voltage, variations in the selection of m, the number of bypassed capacitors 90, during the course of operation of those two systems can be used allow control of power flow in either direction between those two systems.

The number of capacitive modules 90 provided in the column 100 may exceed the number used in the process described above in order to be inserted to replace a capacitive module 90 which fails in operation and is permanently bypassed pending replacement.

Explanation of the foregoing embodiment was based on step-up operation of the embodiment discussed. It will be apparent to those versed in the art that the reverse sequence of operation will transfer power from a higher to a lower voltage bus, constituting step-down operation.

The voltage ratio of the DCT can be changed by changing the number of bypassed capacitors during Step 1 and adjusting the value of the reactor accordingly to maintain the same resonant frequency. Thus another embodiment of the invention, wherein the number m of bypassed capacitors is varied, can be used within a high voltage dc grid to regulate flow on one or more particular lines.

Figure 6:
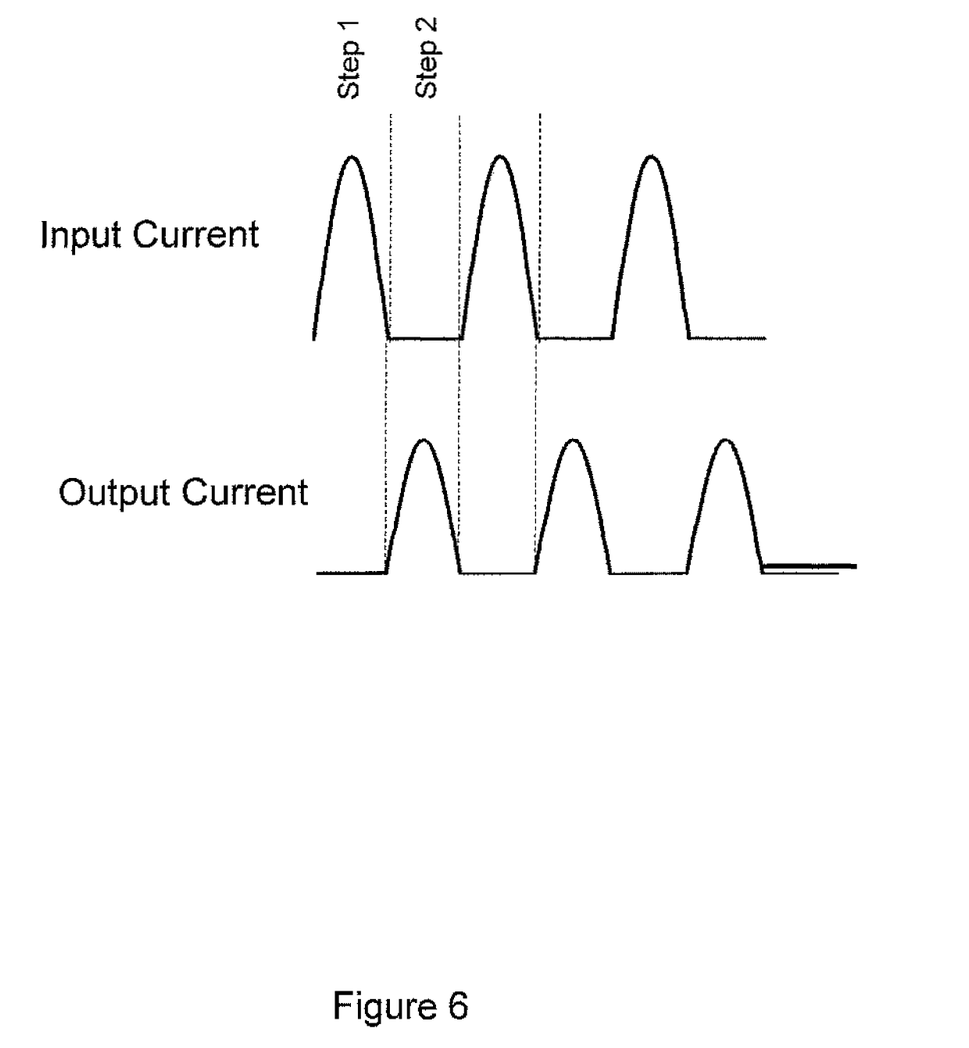
FIG. 6 shows the resonant nature of the low voltage input current pulse and the output current pulse in a multi-modular dc-to-dc power transformation system.
Figure 7:
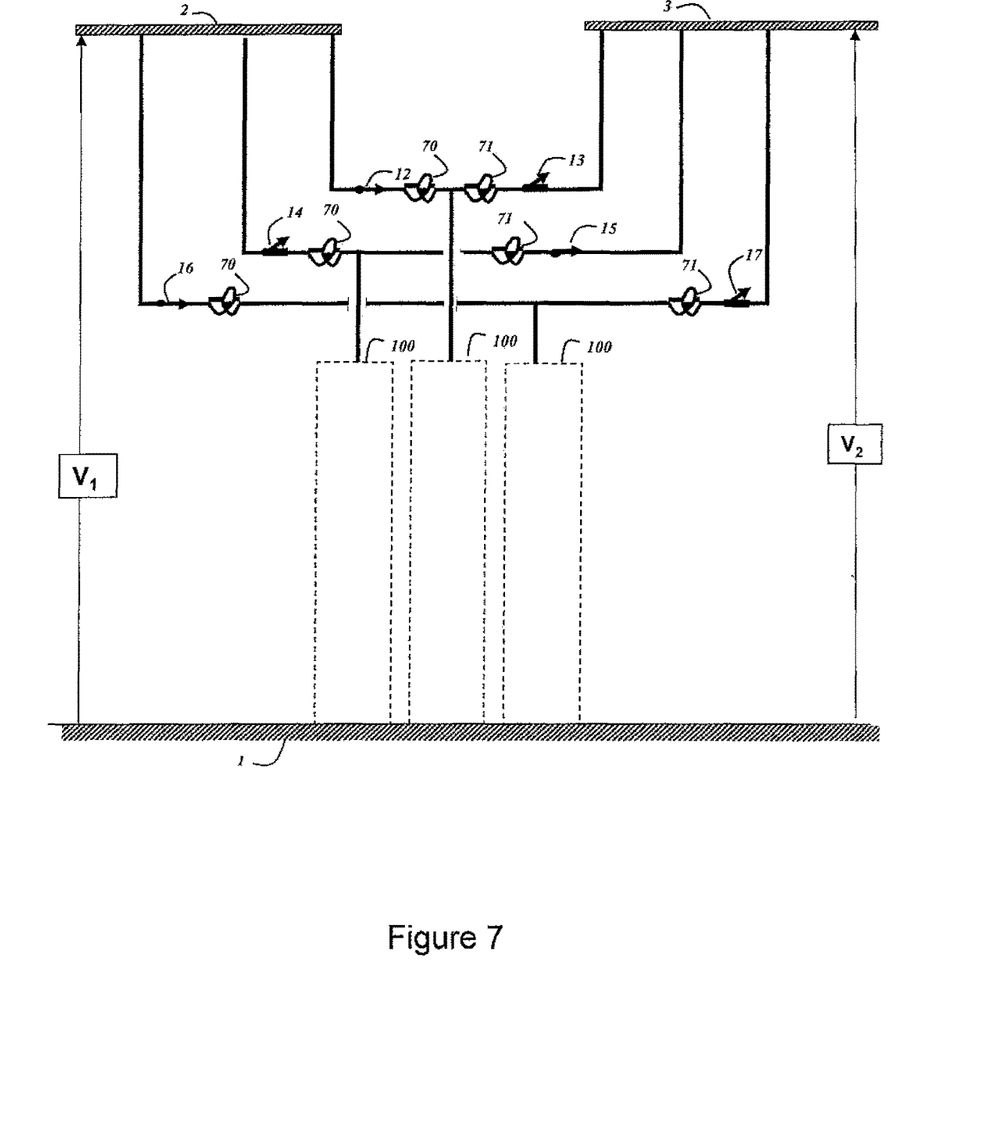
FIG. 7 shows an example in which multiple multi-modular dc-to-dc transformation systems are used both to smooth input and output current levels and to increase the power capability of a compound dc-to-dc transformation system.
Figure 8:
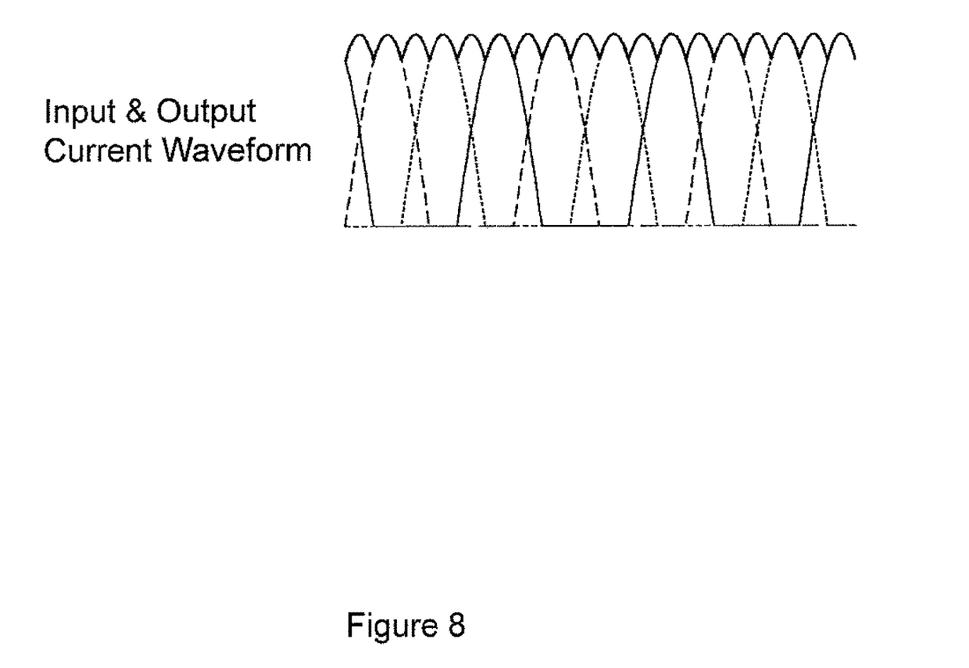
FIG. 8 shows the nature of input and output current wave-form resulting from an example compound dc-to-dc transformation system comprised of three individual dc-to-dc transformers.

Resonant switching within the foregoing method and system will result in both input and output pulse wave forms of the nature shown in FIG. 6; a waveform that would be very difficult to convert to a useful, constant dc current. However a second (compound) embodiment of this invention consists of two or more DCTs in parallel (three in the example illustration of FIG. 7) wherein each is caused to generate pulses equally spaced in time from each other; thus producing a series of additive current pulses as illustrated in FIG. 8 for the three DCT case. The resulting composite dc waveform has been shown by detailed transient simulation to be easily filtered to a smooth dc current. In addition to smoothing both output and input waveforms, the compound DCT embodiment increases the composite megawatt transfer capability of an individual DCT by a factor equal to the number of paralleled DCTs.

Any device embodied into a high voltage dc system must be capable of sustaining accidental short circuits within the connected dc system(s) and, conversely, must not, as a result of short circuits within itself or through its connection to another system, increase the risk or consequences of a short circuit to the connected system(s).

The DCT embodiments cited herein meet those criteria. A fault on either node 2 or node 3 in FIG. 7 will not be conveyed to the other node since at no time is there a galvanic path from one node to the other. When one of each switch pairs 12 and 13, 14 and 15, or 16 and 17 in FIG. 7 are closed, the other is open.

It will be apparent to those versed in the art that in the event of a fault to ground within individual modules such as 90 in FIG. 2, state of the art methods can be employed within half-bridge modules such as that illustrated in FIG. 1 as component 94 to protect remaining modules.

One or more inductors may be included in the capacitor column comprised of individual modules 90 to protect direct capacitor discharge in the event of an internal fault. The total inductance so included in the capacitor column is determined with respect to the values of inductors 70 and 71 to maintain the designed frequency of resonance.

A number of implementations have been described. Nevertheless, it will be understood that additional modifications may be made without departing from the scope of the inventive concepts described herein, and, accordingly, other embodiments are within the scope of the following claims.

What is claimed is:

1. A multi-module dc-to-dc power transformation system that is constructed and arranged to transform power from a first dc voltage node to a separate second dc voltage node, comprising:
   (a) a column comprising a plurality of half-bridge modules connected in series, each half-bridge module comprising a capacitance that is configured to be either electrically inserted into the column or electrically isolated from the column using switches within the column, wherein a first end of the column is electrically connected to ground;
   (b) two high voltage switches, each in series with a reactor; a first of the two high-voltage switches adapted to electrically connect a second end of the column to the first dc voltage node and a second of the two high-voltage switches adapted to electrically connect the second end of the column to the second dc voltage node; and
   (c) a controller adapted to control the states of the switches within the column and the states of the two high voltage switches so as to transform power by resonant exchange of energy between capacitances of the half-bridge modules of the column through the reactors and the first and second dc voltage nodes;
   wherein a half-cycle of resonant and sinusoidally varying current, initiated by a connection of the capacitances of a plurality of half-bridge modules of the column to the first and second dc voltage nodes and interrupted at a first current-zero point, is used by the controller to achieve exchange of energy between the capacitances of a plurality of half-bridge modules and the first and second dc voltage nodes.

2. The system of claim 1 in which a ratio of input and output voltage is established by causing the controller to use the switches within the column to electrically isolate from the column capacitances of half-bridge modules of the column between acceptance of charge from the first dc voltage node and delivery of charge to the second dc voltage node.

3. The system of claim 1 in which stable operation is achieved by equalizing a charge on the capacitances of a plurality of half-bridge modules of the column, such charge equalization accomplished by using the controller to selectively reassign by-pass states among the capacitances of a plurality of half-bridge modules of the column during the connection to a dc voltage node.

4. The system of claim 1 wherein the resonant exchange of energy between capacitances of the half-bridge modules of the column through the reactors and the first and second dc voltage nodes comprises using the controller to control a plurality of sequential column charge-discharge cycles, wherein the states of switches within the column are varied between a column charge cycle and a column discharge cycle.

5. The system of claim 1 comprising multiple columns connected in parallel between ground and the first and second dc voltage nodes, with separate high-voltage switches in series with a reactor between a second end of each column and each of the first and second dc voltage nodes, and wherein the controller is adapted to control states of the separate high-voltage switches.

6. The system of claim 5 in which the controller is further adapted to establish input and output current pulses to or from multiple columns.

7. The system of claim 6 in which the input and output current pulses are equally spaced in time.

8. The system of claim 5 in which a half-cycle of resonant and sinusoidally varying current, initiated by a connection of the capacitances of a plurality of half-bridge modules of the column to the first and second dc voltage nodes and interrupted at a first current-zero point, is used by the controller as a means to achieve exchange of energy between the capacitances of a plurality of half-bridge modules and the first and second dc voltage nodes.

9. The system of claim 5 in which a ratio of input and output voltage is established by causing the controller to use the switches within the column to electrically isolate from the column capacitances of half-bridge modules of each column between acceptance of charge from the first dc voltage node and delivery of charge to the second dc voltage node.

10. The system of claim 5 in which stable operation is achieved by equalizing a charge on the capacitances of a plurality of half-bridge modules of each column, such charge equalization accomplished by using the controller to selectively reassign by-pass states among the capacitances of a plurality of half-bridge modules of each column during a connection to a dc voltage node.

11. The system of claim 5 wherein the resonant exchange of energy between capacitances of the half-bridge modules of each column through the reactors and the first and second dc voltage nodes comprises using the controller to control a plurality of sequential column charge-discharge cycles, wherein the states of switches within the columns are varied between a column charge cycle and a column discharge cycle.

12. A system for power transfer regulation from a first node at one dc voltage to a second node at the same dc voltage, comprising:
   a column comprising a plurality of series-connected capacitances that are configured to be either electrically inserted into the column or electrically isolated from the column using switches within the column; and
   a controller that is adapted to control the electrical insertion and the electrical isolation of the capacitances from the column so as to resonantly exchange energy between the capacitances and the first and second dc voltage nodes;
   wherein a half-cycle of resonant and sinusoidally varying current, initiated by a connection of the capacitances of the column to the first and second dc voltage nodes and interrupted at a first current-zero point, is used by the controller to achieve exchange of energy between the capacitances of the column and the first and second dc voltage nodes.

13. The system of claim 12 in which a ratio of input and output voltage is established by causing the controller to use the switches within the column to electrically isolate from the column capacitances of the column between acceptance of charge from the first dc voltage node and delivery of charge to the second dc voltage node.

14. The system of claim 12 in which stable operation is achieved by equalizing a charge on a plurality of the capacitances, such charge equalization accomplished by using the controller to selectively reassign by-pass states among the capacitances.

15. The system of claim 12 wherein the resonant exchange of energy between capacitances of the column and the first and second dc voltage nodes comprises using the controller to control a plurality of sequential column charge-discharge cycles, wherein the states of switches within the column are varied between a column charge cycle and a column discharge cycle.

16. The system of claim 12 in which the controller is further adapted to establish input and output current pulses from multiple columns.

17. The system of claim 16 in which the input and output current pulses are equally spaced in time.

18. The system of claim 17 in which interruption of current at a current-zero point in a sinusoidally varying current wave shape resulting from resonant connection between a plurality of the capacitances and the first and second dc voltage nodes is used by the controller to complete a resonant exchange of energy.

19. The system of claim 17 in which a ratio of input and output voltage is established by causing the controller to use the switches within the column to electrically isolate capacitances from the column between acceptance of charge from the first dc voltage node and delivery of charge to the second dc voltage node.

20. The system of claim 17 in which stable operation is achieved by equalizing a charge on the capacitances, such charge equalization accomplished by using the controller to selectively reassign by-pass states among the capacitances during a connection to a dc voltage node.

21. The system of claim 17 wherein the resonant exchange of energy between capacitances of the column and the first and second dc voltage nodes comprises using the controller to control a plurality of sequential column charge-discharge cycles, wherein the states of switches within the column are varied between a column charge cycle and a column discharge cycle.

* * * * *